(12) United States Patent
Katz et al.

(10) Patent No.: US 7,566,186 B2
(45) Date of Patent: Jul. 28, 2009

(54) DRIVE COUPLER FOR A BLENDER

(75) Inventors: Jonathan M. Katz, Solon, OH (US); Richard D. Boozer, Wakeman, OH (US); Gregory S. Ans, Brooklyn, OH (US); Robert F. Beesley, Munroe Falls, OH (US); Jay Honsaker, Stow, OH (US); Donald M. Malec, Macedonia, OH (US)

(73) Assignee: Vita-Mix Corporation, Cleveland, OH (US)

( * ) Notice: Subject to any disclaimer, the term of this patent is extended or adjusted under 35 U.S.C. 154(b) by 0 days.

(21) Appl. No.: 11/134,537

(22) Filed: May 20, 2005

(65) Prior Publication Data

US 2006/0275075 A1 Dec. 7, 2006

(51) Int. Cl.
*F16B 13/00* (2006.01)
(52) U.S. Cl. .................. 403/293; 403/286; 403/305; 403/314; 403/329; 403/357; 366/199; 366/205
(58) Field of Classification Search ............... 403/355, 403/356, 357, 359.5, 359.6, 286, 293, 298, 403/305, 306, 292, 294, 297, 300, 301, 314, 403/329; 241/261.2, 261.3; 366/199, 205; 174/84 R; 439/878, 882
See application file for complete search history.

(56) References Cited

U.S. PATENT DOCUMENTS

| | | | | |
|---|---|---|---|---|
| 2,345,749 A * | 4/1944 | Hohwart | | 403/314 |
| 2,370,725 A * | 3/1945 | Gordon | | 403/314 |
| 2,639,904 A * | 5/1953 | McMaster et al. | | 366/199 |
| 2,670,227 A * | 2/1954 | Green | | 403/357 |
| 2,716,564 A * | 8/1955 | Lofqvist | | 403/305 |
| 3,388,934 A * | 6/1968 | Chapman, Jr. et al. | | 403/357 |
| 3,543,605 A * | 12/1970 | Sherman | | 403/356 |
| 4,264,216 A * | 4/1981 | Stansbury, Jr. | | 366/205 |
| 4,783,173 A * | 11/1988 | Artin | | 366/205 |
| 5,365,807 A * | 11/1994 | Darrah et al. | | 403/329 |
| 5,674,026 A * | 10/1997 | Ishibashi et al. | | 403/359.5 |

* cited by examiner

*Primary Examiner*—Michael P Ferguson
(74) *Attorney, Agent, or Firm*—Renner, Kenner, Greive, Bobak, Taylor & Weber

(57) ABSTRACT

A drive coupling assembly (10) for attaching two shafts includes a coupler body (11) and a locking clip (12). The body (11) has a splined opening (23) which is adapted to receive one shaft, and an aperture (24) which is adapted to receive a drive shaft (13) of a motor (14). A slot (25) is formed in coupler body (11) and the slot (25) communicates with the aperture (24). The clip (12) is positioned in the slot (25) and includes a spring tab (33) which can engage an undercut (40) in the shaft (13) to maintain the drive coupling assembly (10) on the shaft (13).

7 Claims, 4 Drawing Sheets

DRIVE COUPLER FOR A BLENDER

TECHNICAL FIELD

This invention relates to a device which couples two shafts. More particularly, this invention relates to a coupler which can be used to attach the drive shaft of the motor of a blender to the shaft of the blade of the blender. More specifically, this invention relates to the manner in which the coupling device may be quickly and easily attached to and detached from the drive shaft of the motor.

BACKGROUND ART

Blenders or food processors have a blade or blades which are positioned in a container or pitcher and which are driven by a motor. Traditionally, a drive coupler is used to couple the shaft of the motor to the shaft carrying the blade. A typical prior art coupler is merely threaded onto the motor shaft in a fashion such that when the motor rotates, the coupler will become tighter on the shaft rather than loosen from the shaft. After some usage, however, these drive couplers wear out and need to be replaced. Such is not an easy task because when one engages and turns the coupler, the entire motor shaft merely rotates, thereby not loosening the coupler from the shaft. To loosen the coupler, the machine must be disassembled to gain access to the armature of the motor so that it can be held while the coupler is removed from the shaft and replaced. Then, of course, the machine must be re-assembled.

A reasonable prior art solution to this problem is to provide a notch on the motor shaft which is engaged by a set screw which can extend through the coupler. While this system may be more convenient than that described above, the installation and replacement procedures for these types of couplers are not without their difficulties. For example, the coupler is hidden by a cosmetic cover, and the set screw on the coupler must be aligned with a hole in the cover so that access to the set screw can be obtained. Then when the coupler is replaced, the set screw is tightened all the way and then backed-off a bit to advantageously allow for some play so that the coupler will self-center. Then the hole in the cover must be filled with a silicone material to avoid contamination. Such is a somewhat tedious and time consuming project.

Thus, the need exists for a drive coupler which can easily and quickly be removed from and attached to the shaft of a motor.

DISCLOSURE OF THE INVENTION

It is thus an object of the present invention to provide a drive coupler which can quickly and easily be utilized to attach one shaft to another shaft.

This and other objects of the present invention, as well as the advantages thereof over existing prior art forms, which will become apparent from the description to follow, are accomplished by the improvements hereinafter described and claimed.

In general, an apparatus for coupling a first shaft having an undercut to a second shaft includes a coupler having an opening to receive and engage the second shaft and an aperture to receive the first shaft. A slot in the coupler communicates with the aperture, and a clip is received in the slot. The clip has a tab which is adapted to engage the undercut of the first shaft.

In accordance with another aspect of the invention, a coupler is adapted to receive the shaft of a blender blade and is adapted to be attached to the shaft of a blender motor, that shaft having an undercut. The coupler includes a body having an aperture to receive the motor shaft, a slot in the body communicating with the aperture, and a clip received in the slot. The clip has a tab which is adapted to engage the undercut of the motor shaft.

A preferred exemplary drive coupler to attach one shaft to another shaft according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
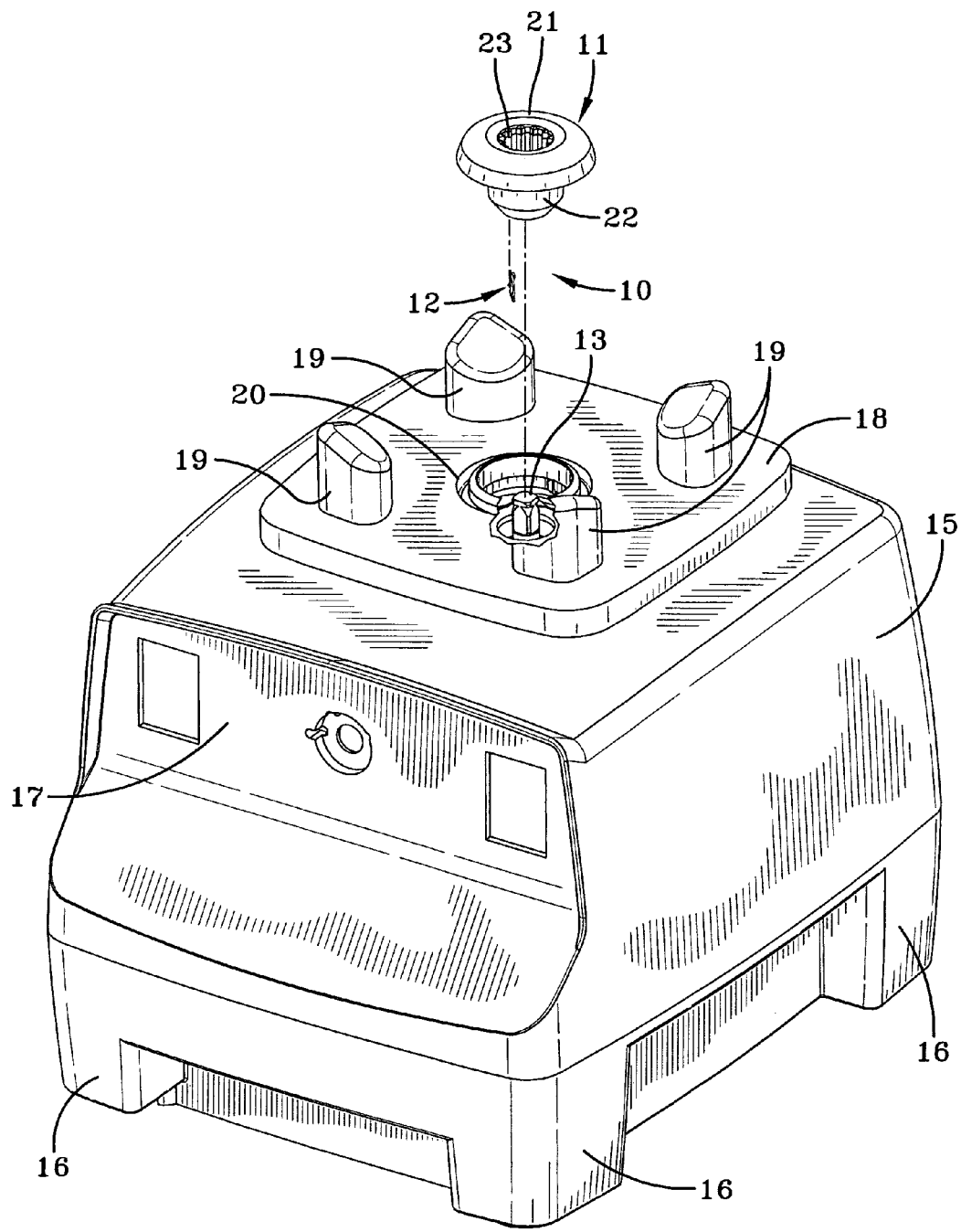
FIG. 1 is an exploded perspective view of the motor housing for a blender and the drive coupling assembly therefor.
Figure 2:
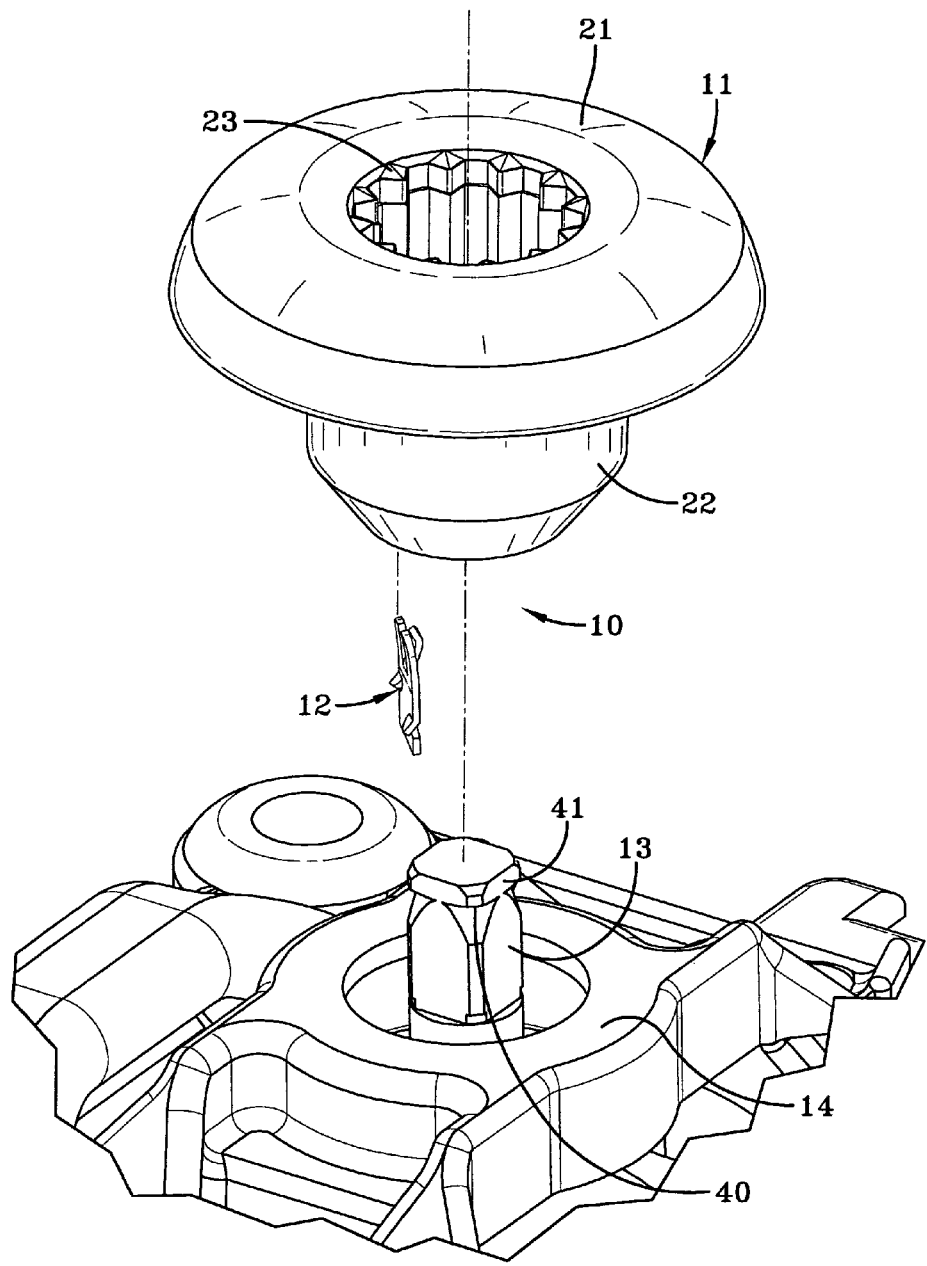
FIG. 2 is a fragmentary, exploded perspective view showing the motor shaft, locking clip, and drive coupler of the present invention.

A drive coupling assembly made in accordance with the present invention is indicated generally by the numeral 10. Drive coupling assembly 10 includes a drive coupler body generally indicated by the numeral 11 and preferably made of a glass filled nylon or like material, and a locking clip generally indicated by the numeral 12 and preferably made of a spring steel or like material. Drive coupling assembly 10 is adapted to be attached to the shaft 13 of a motor 14, schematically shown in FIG. 2, which is maintained within a motor housing 15. Motor housing 15 is shown in the form of a base for a blender and as such it includes, inter alia, feet 16, a control panel 17, a pitcher pad 18, pitcher locator feet 19, and an aperture 20 in pitcher pad 18 through which the motor shaft 13 extends. When coupler body 11 is attached to shaft 13 in a manner to hereinafter be described, a conventional blender pitcher may be placed on pad 18, being properly located by feet 19. While the drive coupling assembly 10 of the present invention is being described with respect to its usefulness in the environment of a blender, it will be evident that the drive coupling assembly 10 could find use in other environments where two shafts are to be coupled.

Drive coupler body 11 is somewhat mushroom-shaped having a cap 21 and a stem 22. Cap 21 is provided with a splined central opening 23 which receives a splined shaft (not shown) of a blade carried in the conventional blender pitcher. Thus, when the pitcher is placed on pad 18, as previously described, the blade shaft, which depends downwardly from the bottom of the pitcher, will be received in opening 23 of coupler cap 21.

Figure 5:
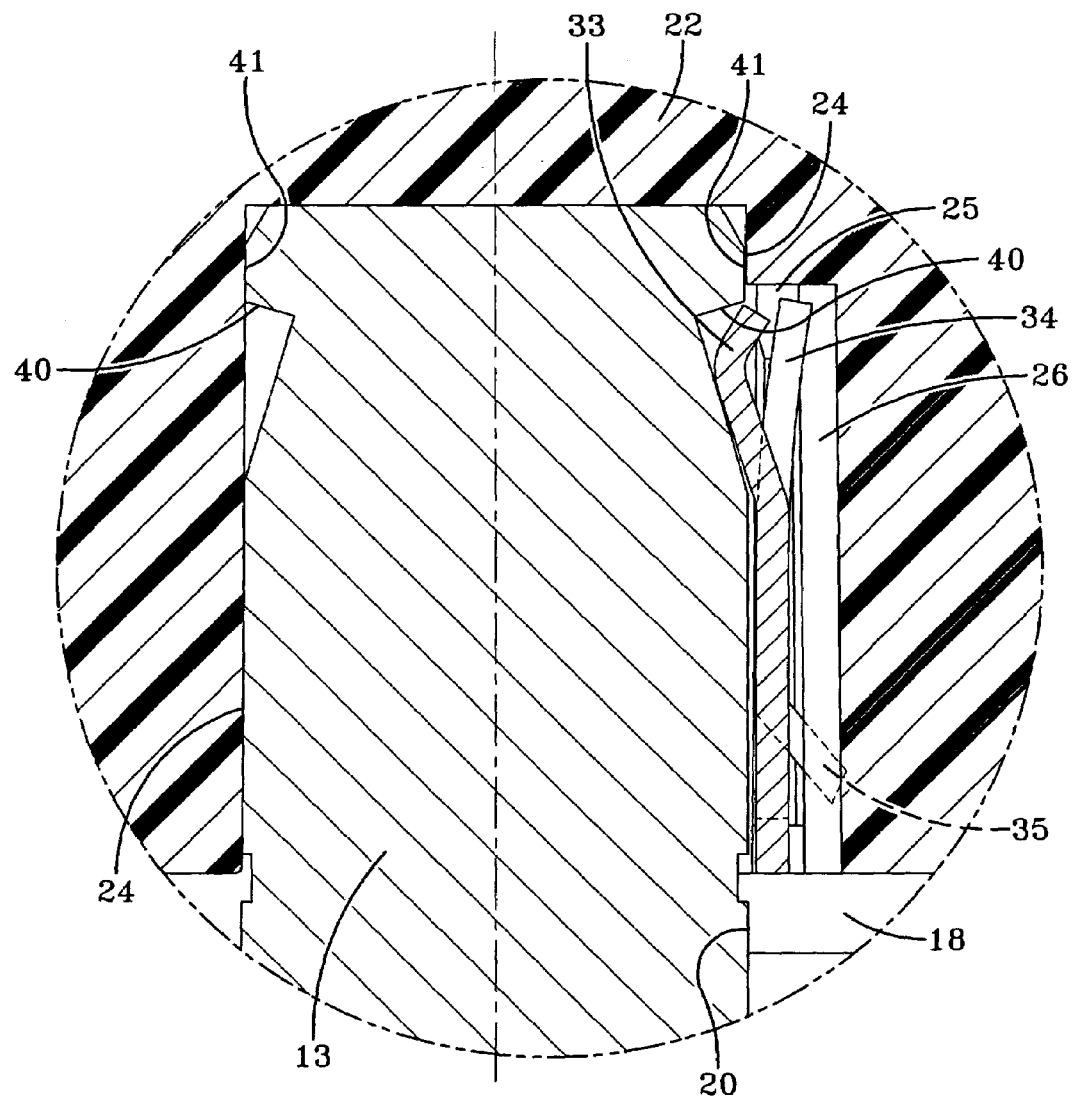
FIG. 5 is a sectional view showing the parts assembled.

Drive coupler stem 22 is provided with an axially directed, rectangular aperture 24 therein sized to snugly receive motor shaft 13 as shown in FIG. 5. Stem 22 is also provided with a clip receiving slot 25 which is preferably formed generally tangent to one of the corners of aperture 24. Slot 25 thus communicates with aperture 24 at that corner. A small slot 26 is also provided in stem 22 adjacent to slot 25 which, as will hereinafter be described, permits movement of clip 12 from slot 25 to slot 26. Slot 26 thus communicates with slot 25.

Figure 3:
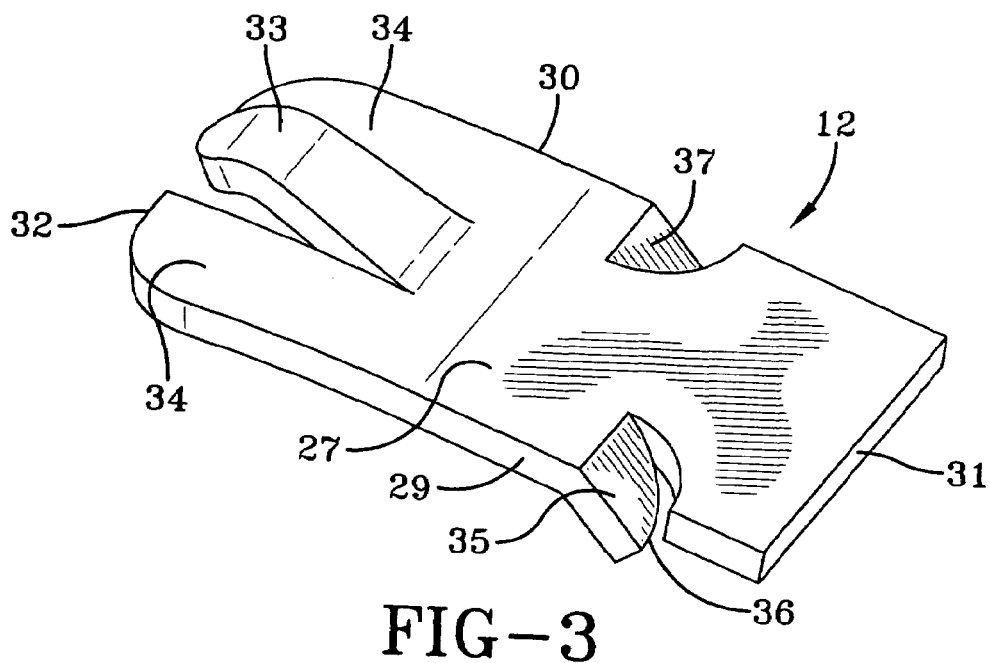
FIG. 3 is a top, rear, side perspective view of the locking clip.
Figure 4:
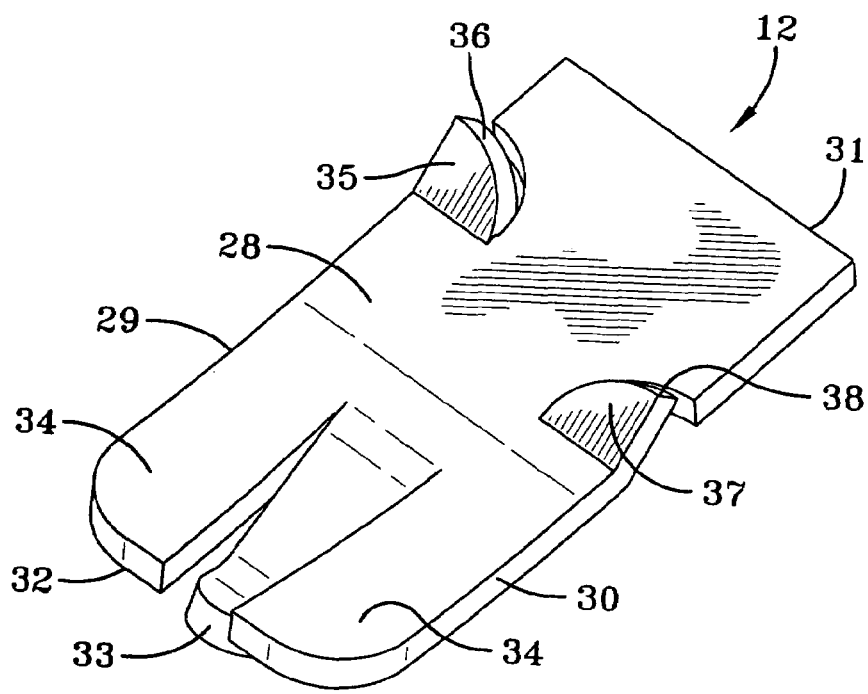
FIG. 4 is a bottom, front, side perspective view of the locking clip.

As shown in FIGS. 3 and 4, locking clip 12 is generally rectangular in configuration having opposed top and bottom surfaces 27, 28, opposed long sides 29, 30 and opposed ends 31, 32. End 31 is generally planar, but end 32 is not. Rather, end 32 is formed with a spring tab 33 being cut out between adjacent tines 34 having rounded corners. As shown, spring tab 33 normally extends upwardly from top surface 27.

Long side 29 has a lock barb 35 formed therein which has a cutting surface 36 extending below bottom surface 28. Similarly, long side 30 has a lock barb 37 formed therein which has a cutting surface 38 extending below bottom surface 28. Lock barb 35 is longitudinally offset from lock barb 37 along the length of clip 12. That is, lock barb 35 is closer to end 31 than is lock barb 37. In fact, as shown, the position where lock barb 35 starts on side 29 is generally laterally opposed to the position where lock barb 37 ends on side 30.

To assemble drive coupling assembly 10, one need only insert end 32 of clip 12 into slot 25, and then clip 12 may be fully pushed into slot 25. It should be noted that for this purpose, the size of slot 25 should approximate the width of clip 12, that is, the length of end 31. If necessary, a hammer or like tool may be used to contact end 31 of clip 12 to force it into slot 25. In so doing, barbs 35 and 37 will engage the material of drive coupler stem 22 to lock clip 12 in place.

In order for assembly 10 to be operable with motor shaft 13, shaft 13 is provided with an undercut 40 just below the top peripheral surface 41 thereof. To attach drive coupling assembly 10 to shaft 13, one need only insert shaft 13 into aperture 24 and push downward on drive coupler cap 21. As clip 12 is passing over shaft surface 41, tab 33 will be deflected into slot 26, which is preferably approximately the width of tab 33 in size. Then, when undercut 40 is reached, tab 33 will snap into the undercut area to hold coupler body 11 on shaft 13. Thereafter, when a blender pitcher has been placed on pad 18 and the blade shaft received in splined opening 23 of coupler cap 21, operation of the motor rotates shaft 13, drive coupler assembly 10, and the blade shaft to operate the blender. Removal of the drive coupler assembly 10, when necessary, is just as simple. One need only pull on drive coupler cap 21 with sufficient force to remove tab 33 from undercut 40 so that coupler body 11 slides off of shaft 13.

It should thus be evident that a drive coupling assembly constructed as described herein accomplishes the object of the present invention and otherwise substantially improves the art.

What is claimed is:

1. Apparatus for coupling a first shaft to a second shaft, the first shaft having an undercut, the apparatus comprising:
   a tubular coupler having a peripheral wall defining an axially extending opening to receive and engage the second shaft at one end and defining an axially extending aperture coaxially aligned with said opening to receive the first shaft at an opposite end, a first slot in said coupler axially extending along and into the peripheral wall of said coupler communicating with and adjoining said aperture, and a second slot axially extending along and into the peripheral wall of said coupler communicating with and extending radially outward from said first slot; and
   a clip having a first axial end and a second axial end, said clip carried by said coupler in said first slot, said clip having spaced tines positioned near said first end and received within said first slot, a tab formed between said tines and extending in a radially inward direction from said clip relative to said tines and adapted to flex to allow axial insertion and removal of the first shaft into said aperture of said coupler and adapted to engage the undercut of the first shaft when the first shaft is received in said aperture, opposed lock barbs extending from said clip in a radially outward direction relative to said tines to lockably engage the peripheral wall of said coupler and positioned on opposed sides of said clip between said first end and said second end, said tab of said clip being allowed to move radially outward through said first slot and into said second slot as said tab flexes during insertion and removal of the first shaft.

2. The apparatus of claim 1 wherein said lock barbs each have a cutting surface for engaging the peripheral wall of the coupler.

3. The apparatus of claim 1 wherein said lock barbs are longitudinally offset from each other.

4. The apparatus of claim 3 wherein said lock barb on one side of said clip ends at a point laterally opposed to where said lock barb on the other side of said clip begins.

5. The apparatus of claim 1 wherein the first shaft is generally square and said aperture is generally square, said first slot communicating with a corner of said aperture.

6. The apparatus of claim 1 wherein said coupler includes a cap and a stem, said cap having said opening and said stem having said aperture.

7. The coupler of claim 1 wherein said opening is splined.

* * * * *